United States Patent [19]
Ney et al.

[11] 3,922,365
[45] Nov. 25, 1975

[54] CHEESE FLAVOR (AMINO ACIDS)

[75] Inventors: Karl Heinz Ney, Hamburg; I. Poetoe Gde Wirotana, Reillingen; Wolfram Gustav Freytag, Halstenbek, all of Germany

[73] Assignee: Lever Brothers Company, New York, N.Y.

[22] Filed: Nov. 12, 1974

[21] Appl. No.: 523,190

Related U.S. Application Data

[63] Continuation of Ser. No. 407,702, Oct. 18, 1973, abandoned, which is a continuation-in-part of Ser. No. 240,811, April 8, 1971, abandoned.

[52] U.S. Cl. ............... 426/534; 426/582; 426/656
[51] Int. Cl.² A23L 1/226; A23L 1/227; A23L 1/228
[58] Field of Search ............................ 426/65, 175

[56] References Cited
UNITED STATES PATENTS
3,520,699  8/1970  Henning .............................. 426/65

FOREIGN PATENTS OR APPLICATIONS
1,154,139  6/1969  United Kingdom

OTHER PUBLICATIONS
Fenaroli's Handbook of Falvor Ingredients, 1971, Edited by Furia et al., Chemical Rubber Co., Cleveland, pp. 741–742.

*Primary Examiner*—Joseph M. Golian
*Attorney, Agent, or Firm*—James J. Farrell, Esq.

[57] ABSTRACT

A process for preparing a foodstuff having a ripe cheese flavor, which process includes introducing into a food composition a mixture of volatile cheese flavor ingredients and admixing with the food composition a mixture of free protein amino acids. A foodstuff with an improved flavor is obtained by admixing with the food composition at least three amino acids of the group consisting of glutamic acid, glycine, lysine and methionine (whereby glycine can be replaced partially or completely by alanine and/or proline). In addition, up to about 10% of other free protein amino acids may be admixed with the food composition.

Specific ratios for the amino acids are given when used in combination with a blue, Cheddar or Swiss cheese flavor composition.

4 Claims, No Drawings

CHEESE FLAVOR (AMINO ACIDS)

This is continuation of application Ser. No. 407,702, filed Oct. 18, 1973, now abandoned which in turn was a continuation-in-part of Ser. No. 240,811, filed April 8, 1971, now abandoned.

The present invention relates to a process for preparing a foodstuff having a ripe cheese flavor, which process includes introducing into a food composition a mixture of volatile cheese flavor ingredients and admixing with the food composition a mixture of free protein amino acids. The invention further relates to a mixture of specific free protein amino acids which can be used in such a process and to a foodstuff prepared by such a process.

In this specification ripe cheese is to be understood as cheese which has undergone changes in its composition by the action of microorganisms and/or enzymes. During the ripening of cheese many low-molecular weight compounds are formed, such as alkanoic acids, 2-alkanones, 2-alkanols, aldehydes, amino acids, 2-oxoalkanoic acids and many other compounds which attribute to the typical flavor of the different varieties of cheese. In this specification flavor means both smell and taste.

In recent years, with the aid of chemical and physical analytical methods substantial progress has been made in the elucidation of the volatile and non-volatile flavor ingredients present in various kinds of cheese. At present it is generally accepted by people skilled in the art that the typical cheese flavor is formed by a specific mixture of volatile ingredients, whereas the amino acids, which are present in large amounts in ripe cheese, but only in small amounts in young cheese, such as curd or fresh cheese varieties, only form the background and rounding off for the typical cheese flavor. In the following paragraphs the state of the art relating to amino acids in cheese is illustrated. The references mentioned are incorporated herein by reference.

Experiments have been carried out, in which each of the nineteen amino acids isolated from ripe Cheddar cheese were added separately to a fresh cheese prepared from pasteurized milk, to see whether by addition of any single amino acid an improvement of the cheese flavor could be obtained. It turned out that this was practically not the case (*J. Dairy Sci.* 32 (1949) 769–774).

In other experiments with Cheddar cheese it was found that the cheese taste of a practically tasteless young cheese was improved by the addition of a mixture of nine amino acids in similar proportions as found in natural Cheddar cheese (*J. Dairy Sci.* 31 (1948) 715–716). This finding was not confirmed by later investigations which were carried out with New Zealand Cheddar cheese. It appeared that the seventeen amino acids found in this cheese show no taste and no flavor of Cheddar cheese. The addition of a mixture of amino acids, corresponding in composition to the amino acids of six months old cheese, to fresh curd gave no improvement with respect to curd to which nothing had been added (*J. Sci. Food Agric.*, 4 (1953) 604–608).

It has also been proposed to incorporate both a cheese flavor mixture and a casein hydrolysate in processed cheese (British Pat. Specification No. 1,127,281). However, when protein hydrolysates are used there is a risk that an undesirable off-flavor will develop in the foodstuffs.

Finally it has been proposed to add a 1:1 mixture of L-lysine and L-glutamic acid to food compositions to improve their nutritive value. It is stated in Austrian Pat. specification No. 224,422 that the addition of such a mixture also improves the taste of the food composition. But in this specification nothing has been mentioned which leads one skilled in the art to the use of the 1:1 mixture for improving the ripe cheese flavor of a food composition.

Thus, it can be concluded from the prior art that it is known that mixtures of amino acids can contribute to a ripe cheese flavor, in particular the cheese taste, but it is not clear which amino acids, and what proportion thereof, are necessary or sufficient for obtaining the desired effect.

It has now been found that a more ripened cheese taste can be imparted to food compositions, in particular young cheese, processed cheese and processed cheese preparations, when the food compositions are admixed with a mixture of at least three amino acids of the group consisting of glutamic acid, glycine, lysine and methionine, in addition to admixture of a volatile cheese flavor composition. Glycine can be replaced partially or completely by alanine or proline or both. Small amounts of other free protein amino acids can be added but from a commercial point of view it is preferable to admix not more than 10% by weight of other amino acids, which percentage is based on the total amount of free protein amino acids admixed with the food composition. Moreover, the addition of appreciable amounts of other amino acids may give rise to undesirable flavor defects. It is indeed surprising that with such simple mixtures of the cheap amino acids, glutamic acid, glycine, lysine and methionine, a marked improvement in the cheese taste can be obtained. It is so surprising because these amino acids are often not the major amino acids present in ripe cheese and further because the above-mentioned prior art does not clearly indicate specific amino acids which may be used to impart improved flavors to food compositions.

It is not within the scope of the present invention to use amino acids which have a chemical formula different from the amino acids present in natural proteins. Therefore, the term protein amino acids is often used in this specification. Further, the term free amino acids is to be understood as denoting the amino acids themselves as well as their salts. This definition is applicable both to the amino acids according to the invention and to the other free protein amino acids. This definition does not apply to such bound amino acids as peptides or esters of amino acids. For example salts such as lysine. HCl and monosodiuim glutamate are within the scope of the instant invention.

The amounts of salt used must be stoichiometric, which means that, for example, 147 parts glutamic acid are equivalent to 169 parts monosodium glutamate and 146 parts lysine are equivalent to 182.5 parts lysine. HCl. Of the amino acids admixed with a food composition according to the invention alanine, glutamic acid, lysine and proline are used in the form of their L-isomers; glycine has no optical activity, thus no L- or D-isomers of glycine exist. Methionine can be used in the form of its L-isomer or as the racemate, i.e. DL-methionine.

The total amount of free protein amino acids admixed with a food composition is from about 250 to about 60,000 mg per kg foodstuff.

Accordingly the present invention provides an improved process for preparing a foodstuff having a ripe cheese flavor, which process includes introducing into a food composition a mixture of volatile cheese flavor ingredients and admixing with the food composition a mixture of free protein amino acids, which improvement comprises admixing with the food composition at least three amino acids or salts thereof selected from the group consisting of (i) glutamic acid; (ii) glycine or alanine or proline or a mixture thereof; (iii) lysine; and (iv) methionine; in amounts such that (a) the total amount of free protein amino acids is from about 250 to about 60,000 mg per kg foodstuff, and (b) the ratio by weight of the sum of the amino acids named in (i) to (iv) to the total free protein amino acids admixed with the food composition is not less than 90%.

The invention further provides a foodstuff prepared by such a process, as well as a mixture of amino acids or salts thereof, suitable for use in such a process, consisting of (a) from 90 to 100% by weight of at least three amino acids selected from the group consisting of (i) glutamic acid; (ii) glycine or alanine, or proline or a mixture thereof; (iii) lysine; and (iv) methionine; and (b) from 10 to 0% by weight of other free protein amino acids.

Preferably, the amino acids according to the invention are admixed with a food composition in such a manner that the concentration of each of at least three of glutamic acid, glycine, lysine and methionine (alanine and proline being calculated as glycine substitutes) is at least twice as large as that of any other free protein amino acid.

A particular embodiment of the present invention is a process for preparing a foodstuff having a sharp but not sweet taste as is the case for example with foodstuffs having a ripe Cheddar or blue cheese flavor. A preferred mixture to be used in such a process is one consisting essentially of from 30 to 60% by weight of monosodium glutamate, from 5 to 30% by weight of methionine, and from 65 to 10% by weight of lysine.HCl. For preparing a foodstuff having a ripe Cheddar flavor, such a mixture can be admixed with a food composition in an amount of from 250 to 32,000 mg per kg foodstuff, preferably from 3,000 to 12,000 mg/kg. For preparing a foodstuff having a ripe blue cheese flavor such a mixture can be admixed with a food composition in an amount of from 500 to 20,000 mg/kg, preferably from 3,000 to 8,000 mg/kg. If such a mixture is added to a food composition which does not contain any of the amino acids as added, the relative proportions of glutamic acid:lysine:methionine in the final foodstuff will be (26–52):(8–52):(5–30).

Another particular embodiment of the present invention is a process for preparing a foodstuff having a distinctly sweet taste as is the case for example with foodstuffs having a ripe Emmental cheese flavor. In the USA and some other countries Emmental cheese is known as Swiss cheese. A preferred mixture to be used in such a process is one consisting essentially of from 40 to 50% by weight of monosodium glutamate, from 10 to 20% by weight of lysine.HCl, and from 40 to 50% by weight of glycine or alanine or proline or a mixture thereof. For preparing a foodstuff having a ripe Emmental cheese flavor, such a mixture can be admixed with a food composition in an amount of from 500 to 40,000 mg per kg foodstuff, preferably 6,000 to 30,000 mg/kg. If such a mixture is added to a food composition which does not contain any of the amino acids as added, the relative proportions of glutamic acid:glycine:lysine (alanine and proline being calculated as glycine substitutes) in the final foodstuff will be (34–44):(40–50):(8–16).

The mixtures of amino acids according to the invention cannot be simplified further without the total flavor of the foodstuff being impaired. In fact, it has been found that restriction to the addition of a mixture of only two amino acids or to the addition of a single amino acid in comparable amounts results in either no improvement in the specific cheese flavor or in an unfavorable influence on the total flavor of the foodstuff. Thus the exclusive addition of L-glutamic acid or sodium glutamate has a deteriorating effect on the taste of young cheese, processed cheese or processed cheese preparations flavored with mixtures of volatile cheese flavor ingredients, although for a great number of other foods, e.g. preserved soups, vegetables and meat products, sodium glutamate is a known taste intensifier and improver. The process according to the invention has the advantage that it gives an excellent rounding off of the specific cheese flavor of the foodstuff.

The addition of mixtures of amino acids according to the invention can take place simultaneously with the addition of mixtures of cheese flavor ingredients, e.g. to young cheese. In the case of processed cheese and processed cheese preparations the addition of the mixture of amino acids is conveniently carried out before or during the melting, thus before the mixture of volatile flavor ingredients is added. Of course the ingredients can be added separately, but it is preferred that the amino acids be mixed before addition to the food composition. In order to improve the homogeneous admixing of the amino acids and the food composition, the mixture of amino acids can also be added, dispersed in a carrier, which carrier is part of a previous batch of the food composition to which the mixture is added or one of its ingredients, for example the melting salt used in the preparation of a processed cheese.

Mixtures of volatile cheese flavor ingredients which are added to food compositions can for example be flavor concentrates which are obtained in a known manner by steam distillation and subsequent concentration of the distillate from ripe or old cheese, for example Cheddar cheese and Emmental cheese. However, volatile compositions which are mixtures of compounds synthesised in vitro corresponding to the flavor ingredients occurring in natural ripe or old cheese can also be used for the method according to the invention. Such volatile mixtures are described in the art, see for example U.S. Pat. No. 3,520,699 and J. Merory; *Food Flavorings;* 2nd Ed. 1968; Avi Publishing Comp., pages 191–192, describing blue cheese and Cheddar flavor compositions, which references are incorporated herein by reference.

A mixture of cheese flavor ingredients can also be introduced into a food composition by adding enzymes to a food composition. For example, when the food composition contains butterfat and water, such as cream, lipases can be added which hydrolyse the glycerides into glycerol and free fatty acids, which are major components of most cheese flavors. The use of microorganisms for producing lipases in the production of a cheese flavor concentrate is described in British Pat. Specification No. 1,057,170.

The most important food compositions to which a more rounded cheese flavor is imparted according to the invention are the following cheese products, viz.

young cheese, processed cheese, particularly processed cheese prepared from young, relatively tasteless raw cheese, processed cheese preparation, quark, margarine cheese, creamed cheese, cheese fondu, cheese powder or the like. However, the amino acids, according to the invention, in addition to cheese flavoring compositions can also be added to other food compositions in which a cheese taste is desired, such as for example soups, sauces, pies, sandwich spreads, cheese pastries, pizza or similar foodstuffs.

In this specification percentages and ratios are by weight, unless otherwise stated.

The invention will be illustrated by the following examples, without being limited thereto.

COMPARATIVE EXPERIMENT C I

From 100 g young cheese, 64 g water and 3 g melting salt (a mixture of commercially used polyphosphates) a processed cheese was prepared in a casserole under stirring and careful heating up to 80°C. Stirring was continued for 10 minutes and then 0.1 g of a flavor concentrate, obtained in the known manner from old Cheddar cheese by steam distillation and subsequent concentration of the distillate, was added to the melted mass which was cooling. In this way a processed cheese with a Cheddar taste was obtained which, however, was not full and which, when the taste was judged by a panel of experts, was only given 4 out of the possible maximum of 8 points.

COMPARATIVE EXPERIMENT C II

A processed cheese prepared from 100 g young cheese as in Comparative Experiment C I was mixed with gradual cooling, with 0.1 g of a flavor concentrate from ripened Emmental cheese. The finished product had the typical smell of processed cheese from rip Emmental cheese but on the other hand the taste was not spicy and full enough. The product was therefore given only 4 points for taste.

EXAMPLE I

The following mixtures of amino acids were prepared by mixing:

|  | A | B | C | D | E |
| --- | --- | --- | --- | --- | --- |
| monosodium L-glutamate | 2 | 5 | 1 | 40 | 435 |
| L-lysine.HCl | 2 | 4 | 1 | 10 | 377 |
| D/L-methionine | 1 | 2 | — | — | 188 |
| L-alanine | — | — | 2 | — | — |
| L-proline | — | — | — | 0.6 | — |
| glycine | — | — | — | 49.4 | — |

The figures give the parts by weight of amino acid mixed with each other. The monosodium L-glutamate content of composition C is 25%. From 100 g young cheese a processed cheese was prepared and flavored as in Comparative Experiment C I. However, in addition, during the melting 0.8 g (i.e. about 5,300 mg/kg) of a mixture of amino acids A was added. The processed cheese obtained had a full taste and was given 7 points for taste.

EXAMPLE II 100 g young cheese, to which 25% whey powder and 2 g (i.e. about 11,000 mg/kg) of the mixture of amino acids B were added, was worked up in a known manner to a processed cheese preparation and when the melted mass was cooling, it was intensively mixed with 0.1 g of a flavor concentrate from old Cheddar cheese. The finished product had an excellent rounded taste.

EXAMPLE III

A processed cheese prepared as in Comparative Experiment C II was mixed during melting with 0.8 g (i.e. about 5,300 mg/kg) of a mixture of amino acids C. The finished product had the typical smell of Emmental cheese and the taste was full and rounded. It was given 6 points for taste.

EXAMPLE IV

A processed cheese prepared and flavored as in Comparative Experiment C II was mixed during melting with 3.0 g (i.e. about 20,000 mg/kg) of a mixture of amino acids D. The finished product had the typical smell and taste characteristics of a processed cheese from ripe Emmental cheese and was given 7 points for taste.

EXAMPLE V

From 100 g young Cheddar cheese, 64 g water and 3 g melting salt a processed cheese was prepared in a casserole under stirring and under careful heating up to 80°C. To this melted mass 0.1 g of a flavor concentrate obtained from ripe blue cheese and 5,000 mg/kg of a mixture of amino acids E were added. After it had been stirred for 10 minutes at 80°C the mass was allowed to cool. In this manner a processed cheese was obtained with a pleasant and completely satisfying blue cheese flavor.

EXAMPLE VI 150 g young Cheddar, comminuted in a mincing machine, 4.5 g melting salt and 1.2 g of a mixture of amino acids E were heated au bain-marie while ¼ l hot milk was added slowly. Subsequently 0.5 g kitchen salt and 0.3 g of a blue cheese flavor concentrate, obtained in a known manner from ripe blue cheese, were added together with pepper to taste. In this way a creamed cheese sauce was obtained having a pleasant blue cheese taste.

EXAMPLE VII

A Provolone cheese flavoring composition was admixed with a young, not-ripened cheese yielding a product having a flavor similar to Provolone cheese.

After addition of a mixture of amino acids containing 50% monosodium glutamate, 20% glycine, 20% lysine and 10% methionine in an amount of 6,000 mg/kg the product obtained had a more rounded taste similar to Provolone.

What we claim is:

1. In a process for preparing a foodstuff having a ripe cheese flavor, which process includes introducing into a food composition a mixture of volatile cheese flavor ingredients which include the following:
   a. alkanoic acids,
   b. 2-alkanones,
   c. 2-alkanols,
   d. aldehydes, and
   e. 2-oxoalkanoic acids, and further with said food composition a mixture of free protein amino acids, the improvement which comprises:

admixing with the food composition at least three amino acids or salts thereof selected from the group consisting of:

i. glutamic acid,
ii. glycine or alanine or proline or a mixture thereof;
iii. lysine; and
iv. methionine; in amounts such that
a. the total amount of free protein amino acids admixed with the food composition is from about 250 to about 60,000 mg per kg foodstuff,
b. the ratio by weight of the sum of the amino acids named in (i) to (iv) to the total free protein amino acids admixed with the food composition is not less than 90%, and
c. the amount of said glutamic acid is 25% to 60% by weight calculated as monosodium glutamate, the amount of said lysine is 10% to 65% by weight calculated as lysine . HCl, the amount of said methionine is 5% to 30% by weight, and the amount of said glycine or alanine or proline or a mixture thereof is 20% to 50% by weight, which percentages are based on the total amount of free protein amino acids admixed with the food composition.

2. A process according to claim 1, in which a mixture of amino acids, consisting essentially of from 30 to 60% by weight of monosodium glutamate, from 5 to 30% by weight of methionine, and from 65 to 10% by weight of lysine.HCl is admixed with the food composition in an amount of from about 3,000 to about 12,000 mg per kg foodstuff.

3. A process according to claim 1, in which a mixture of amino acids, consisting essentially of from 40 to 50% by weight of monosodium glutamate, from 10 to 20% by weight of lysine.HCl, and from 40 to 50% by weight of glycine or alanine or proline or a mixture thereof, is admixed with the food composition in an amount of from about 6,000 to about 30,000 mg per kg foodstuff.

4. A foodstuff prepared by a process according to claim 1.

* * * * *